(12) United States Patent
Popovic et al.

(10) Patent No.: US 6,947,395 B1
(45) Date of Patent: Sep. 20, 2005

(54) LOCATING NETWORK ECHOS

(75) Inventors: Mirjana Popovic, Ottawa (CA); Dieter Schulz, Kanata (CA)

(73) Assignee: Mitel Networks Corporation, Kanata (CA)

( * ) Notice: Subject to any disclaimer, the term of this patent is extended or adjusted under 35 U.S.C. 154(b) by 981 days.

(21) Appl. No.: 09/662,259

(22) Filed: Sep. 14, 2000

(30) Foreign Application Priority Data

Sep. 14, 1999 (GB) .................................. 9921555

(51) Int. Cl.⁷ .............................................. H04B 3/20
(52) U.S. Cl. ...................... 370/286; 370/287; 370/288; 370/289; 370/290; 370/291; 379/406.01; 379/406.05; 379/406.08; 379/406.09
(58) Field of Search ................. 370/276, 277, 370/286–291; 379/406.01, 406.02, 406.03, 379/406.05, 406.06, 406.07, 406.08, 406.09

(56) References Cited

U.S. PATENT DOCUMENTS

| 4,823,382 | A |   | 4/1989  | Martinez |            |
|-----------|---|---|---------|----------|------------|
| 5,295,136 | A |   | 3/1994  | Ashley et al. |       |
| 5,343,522 | A |   | 8/1994  | Yatrou et al. |       |
| 5,400,394 | A | * | 3/1995  | Raman et al. | 370/290 |
| 5,649,012 | A | * | 7/1997  | Gupta et al. | 370/291 |
| 5,724,485 | A | * | 3/1998  | Rainton | 706/14 |
| 5,818,945 | A | * | 10/1998 | Makino et al. | 370/291 |
| 6,185,300 | B1 | * | 2/2001  | Romesburg | 370/290 |

FOREIGN PATENT DOCUMENTS

EP  0798877  10/1997
GB  2123258  1/1984

* cited by examiner

*Primary Examiner*—Wellington Chin
*Assistant Examiner*—Raj Jain
(74) *Attorney, Agent, or Firm*—Beyer Weaver & Thomas, LLP

(57) ABSTRACT

An echo cancelling system for cancelling echoes in a communication path includes an echo locator and an echo canceller. The echo locator is coupled to the communication path and locates the positions of echo signals received from the communication path. The echo canceller is also coupled to the communication path and cancels echo signals received therefrom. During echo cancellation, the echo canceller becomes active in regions corresponding to the positions of echo signals in response to the echo locator.

8 Claims, 2 Drawing Sheets

LOCATING NETWORK ECHOS

FIELD OF THE INVENTION

Figure 1:
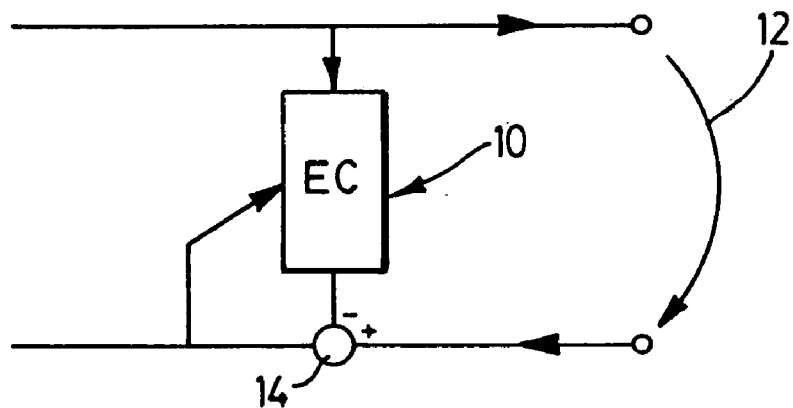

The present invention relates generally to communication networks and in particular to an echo cancelling system and method for cancelling echos in a communication path.

BACKGROUND OF THE INVENTION

Echo cancellers to cancel echos in a communication path are well known. A typical echo canceller generates a filter that models the transfer function of the echo signal path using a linear algorithm such as a least-mean-squared (LMS) algorithm. Network signals conveyed to the echo signal path are also conveyed to the echo canceller. The filter therein processes the network signals to generate an estimated copy of echo signals received from the echo signal path. The estimated echo signals and actual echo signals received from the echo signal path are subtracted. Differences between the estimated echo signals and the actual echo signals result in error signals, which are fed back to the echo canceller so that the echo canceller can converge to the correct transfer function.

When dealing with long delay networks, the echo signal path can change and can be different from call to call. As a result, an adaptive algorithm is required to allow the echo canceller to model adaptively the echo signal path. Unfortunately, the longer the time window or delay of the echo signals that are required to be cancelled, the longer the adaptive algorithm takes to adapt to the correct transfer function.

In addition, as the total time window increases, the number of coefficients in the filter generated by the adaptive algorithm increases, requiring more processing power. Placing conventional echo cancellers in long delay networks to cancel echos from traditional networks such as public switched telephone networks (PSTNs) or private branch exchanges (PBXs) increases the complexity and cost significantly.

It is therefore an object of the present invention to provide a novel echo cancelling system and method and a novel echo locator.

SUMMARY OF THE INVENTION

In accordance with one aspect of the present invention there is provided an echo cancelling system for cancelling echoes in a communication path comprising:
  an echo locator coupled to said communication path to locate the positions of echo signals received from said communication path; and
  an echo canceller coupled to said communication path to cancel echo signals received therefrom, said echo canceller becoming active in regions corresponding to the positions of echo signals in response to said echo locator.

In accordance with another aspect of the present invention there is provided a method of cancelling echoes in a communication path comprising the steps:
  locating the positions of echo signals in said communication path; and
  activating an echo canceller only in regions corresponding to the positions of the echo signals thereby to cancel echoes in said communication path.

In accordance with yet another aspect of the invention there is provided an echo locator to locate echoes in a communication path comprising:
  a first downsampler downsampling signals transmitted to said communication path and generating downsampled reference signals;
  a second downsampler downsampling return signals received from said communication path and generating downsampled return signals; and
  an adaptive filter generating an aliased transfer function approximating that of said communication path to produce aliased estimated return signals in response to said downsampled reference signals, said adaptive filter subtracting the aliased estimated return signals from said downsampled return signals to generate error signals, said error signals being fed back to said adaptive filter to adjust the transfer function thereof, said adaptive filter generating output corresponding to peaks in said transfer function thereby to signify the location of echoes in said return signals.

The present invention provides advantages in that since the position of echos in the echo signal time window are determined, the echo canceller can be made active only in those areas in the time window. As a result, a reduced number of filter coefficients used to generate the filter modeling the echo signal path need to be active. This allows the echo canceller to adapt faster to changes in the echo signal path. In addition, by reducing the number of active filter coefficients, fewer processing cycles are required to generate the filter. Furthermore, the echo canceller is more robust in adverse conditions.

BRIEF DESCRIPTIONS OF THE DRAWING

Figure 2:
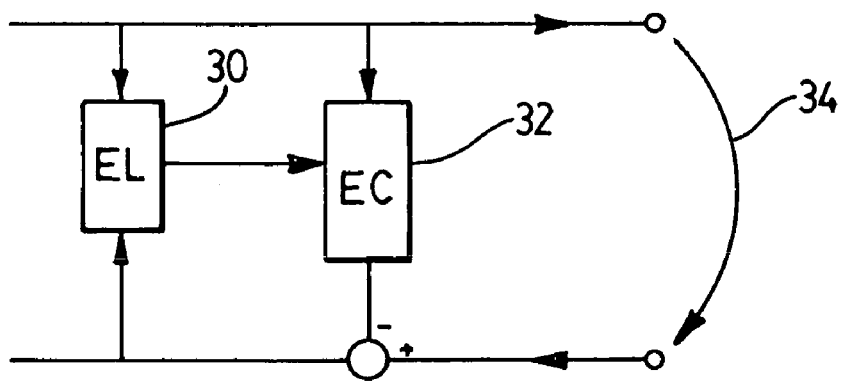
Figure 3:
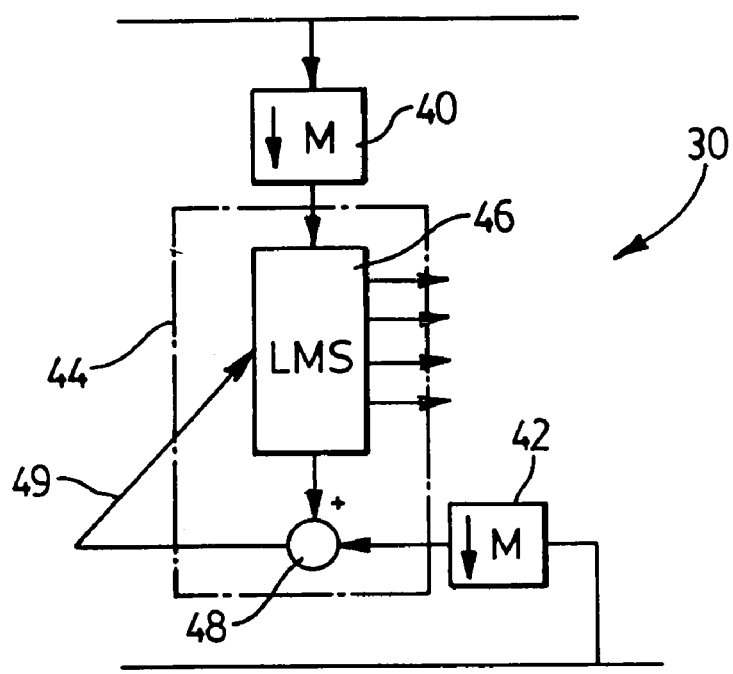
Figure 4:
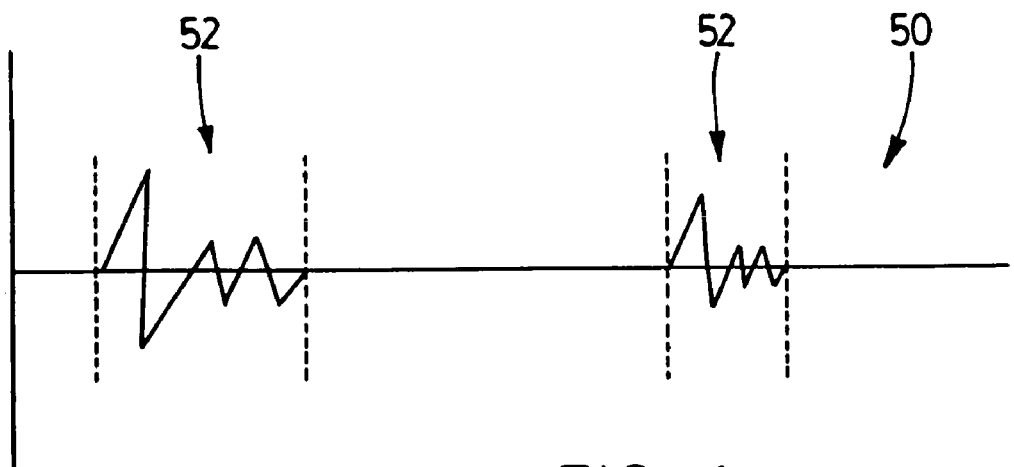

An embodiment of the present invention will now be described more fully with reference to the accompanying drawings in which:
  FIG. 1 is a schematic diagram of a conventional prior art echo canceller;
  FIG. 2 is a schematic diagram of an echo canceller and echo locator in accordance with the present invention;
  FIG. 3 is a schematic diagram of the echo locator of FIG. 2; and
  FIG. 4 is a graph showing an echo signal received from an echo signal path.

DETAILED DESCRIPTION OF THE PREFERRED EMBODIMENT

Turning now to FIG. 1, a conventional echo canceller in parallel with a communication path 12 in which echo signals are generated is shown and is generally indicated to by reference numeral 10. The echo canceller 10 generates a filter modeling the transfer function of the echo signal path using a least-mean-squared (LMS) algorithm so that the echo canceller generates estimated echo signals that are the same as the echo signals received from the communication path 12. The estimated echo signals are subtracted 14 from the actual echo signals in an attempt to cancel the echo signals. The amount of cancellation is commonly referred to as ERLE. Differences between the estimated echo signals and the actual echo signals result in error signals. The error signals are fed back to the echo canceller 10 so that the echo canceller can attempt to converge to the correct transfer function and generate a filter which more closely models the echo signal path.

As mentioned previously, the algorithm executed by the echo canceller 10 takes longer to converge to the correct transfer function as the time window of echo signals received from the communication path 12 increases. As a result, echo signals pass through the echo canceller 10.

To deal with the above, a network echo locator 30 in accordance with the present invention is provided and is used in conjunction with an echo canceller 32. As can be seen in FIG. 2, the echo locator 30 is in parallel with the echo canceller 32. The echo locator 30 provides input to the echo canceller 32 which is used by the echo canceller to limit the number of active filter coefficients or taps during generation of the filter modeling the communication path 34.

Turning now to FIG. 3, the echo signal locator 30 is better illustrated. As can be seen, the echo locator 30 includes a downsampler 40 receiving reference signals transmitted to the communication path 34 and downsampler 42 receiving return signals from the communication path 34. The downsampler 40 downsamples the transmitted reference signals by a factor of M without a downsampling filter while the downsampler 42 downsamples the return signals by the same factor of M without a downsampling filter. An adaptive filter 44 receives the downsampled reference and return signals and includes an LMS processor 46 executing an LMS algorithm. The LMS algorithm generates an aliased transfer function modelling the communication path 34 and processes the downsampled reference signals to produce estimated downsampled return signals. The estimated downsampled return signals are subtracted (block 48) from the downsampled return signals to generate feedback error signals 49, which are used to adjust the transfer function. The LMS processor 46 generates output signals corresponding to the peaks in the transfer function, which are conveyed to hie echo canceller 32 to activate selected filter coefficients thereof.

The peaks in the aliased transfer function of the echo locator 30 represent the areas of active echoes in the communication path 34. Only these areas need to be active in the echo canceller 32 in order to cancel the echoes. For example, if M=4 and the peaks in the aliased transfer function of the LMS processor 42 are at positions 3, 4 and 5 and 10, 11, and 12, then the filter coefficients or taps in the LMS algorithm of the echo canceller 32 which need to be made active by the echo locator 30 are:

$3 \times M=12$ up to $5 \times M=20$; and $10 \times M=4$ up to $12 \times M=48$.

The remaining taps of the echo canceller are considered to be equal to zero and do not need to be used in the adaptation calculation or filtering of the echo canceller.

If desired, a weighting function can be applied to the taps in the echo canceller 32 based on the magnitude of the peaks in the aliased transfer function of the echo locator 30. In this case, higher peaks in the transfer function of the echo locator result in higher weightings applied to the corresponding taps in the echo canceller.

Turning now to FIG. 4, a time window 50 for an echo signal is shown. As can be seen, within the time window, echo signals 52 are present in only two locations within the time window. In a conventional echo signal canceller, the filter generated by the echo canceller will be active over the entire time window. However, through use of the echo locator of the present invention, the echo canceller, which is responsive to the echo locator, is only active in the regions within the time window in which echo signals are present.

Although a preferred embodiment of the present invention has been described, those of skill in the art will appreciate that variations and modifications may be made without departing from the spirit and scope thereof as defined by the appended claims.

We Claim:

1. An echo cancelling system for cancelling echoes in a communication path comprising:
   an echo locator coupled to said communication path to locate positions of echo signals in a signal time window received from said communication path, said echo locator including a first adaptive filter generating a transfer function approximating that of said communication path; and
   an echo canceller coupled to said communication path to cancel echo signals received there from, said echo canceller including a second adaptive filter having selectable filter coefficients, wherein peaks in said transfer function are used by said echo locator to generate output signals to activate selected filter coefficients of said second adaptive filter corresponding to the positions of echo signals in said signal time window received from said communication path, said output signals having magnitudes proportional to the magnitudes of said peaks.

2. An echo cancelling system as defined in claim 1 wherein said transfer function is an aliased transfer function.

3. An echo cancelling system as defined in claim 1 wherein said first and second adaptive filters are LMS adaptive filters.

4. A method of cancelling echoes in a communication path comprising the steps:
   locating the positions of echo signals in a signal time window in said communication path and generating a transfer function approximating that of said communication path;
   determining the peaks in said transfer function and generating output signals having magnitudes proportional to the magnitudes of said peaks; and
   activating an echo canceller only in regions of said signal time window corresponding to the positions of the echo signals in response to said output signals thereby to cancel echoes in said communication path.

5. An echo cancelling system for cancelling echoes in a communication path, comprising:
   an echo locator connected to said communication path and operable to downsample reference signals transmitted to the communication path and return signals received from the communication path, said echo locator including a first adaptive filter operable to generate a transfer function approximating said communication path from said downsampled reference and return signals and generate output signals corresponding to peaks in said transfer function, the magnitudes of said output signals being dependent on the magnitudes of said peaks; and
   an echo canceller connected to said communication path and having a second adaptive filter including selectable filter coefficients allowing said echo canceller to be activated in selected regions corresponding to the positions of echoes in a signal time window, said echo canceller being responsive to said output signals and activating selected filter coefficients thereby to cancel said echoes.

6. An echo cancelling system as defined in claim 5, wherein said first adaptive filter employs a LMS method to generate said transfer function.

7. An echo cancelling system as defined in claim 5, wherein said second adaptive filter is an LMS filter.

8. An echo cancelling system as defined in claim 5, wherein said transfer function is an aliased transfer function.

* * * * *